United States Patent [19]

Eickmann

[11] Patent Number: 4,690,623

[45] Date of Patent: Sep. 1, 1987

[54] FLUID PUMPS, FLUID MOTORS AND DEVICES, WHICH INCLUDE A CONED RING

[76] Inventor: Karl Eickmann, 2420 Isshiki, Hayama-machi, Kanagawa-Ken, Japan

[21] Appl. No.: 806,574

[22] Filed: Dec. 9, 1985

Related U.S. Application Data

[60] Division of Ser. No. 282,990, Jul. 14, 1981, Pat. No. 4,557,347, which is a continuation of Ser. No. 910,809, May 30, 1978, abandoned, and a continuation-in-part of Ser. No. 911,246, May 31, 1978, abandoned, and a continuation-in-part of Ser. No. 224,769, Jan. 13, 1981, abandoned.

[51] Int. Cl.4 .................. F04B 43/00; F01B 19/00
[52] U.S. Cl. .................. 417/472; 417/271; 92/45; 92/46; 92/42
[58] Field of Search .................. 417/273, 472, 271; 92/45, 42, 46, 47; 91/491

[56] References Cited

U.S. PATENT DOCUMENTS

| 1,180,947 | 4/1916 | Scott | 92/45 |
|---|---|---|---|
| 1,195,133 | 8/1916 | Dalen | 92/45 |
| 1,526,015 | 2/1925 | Sanner | 92/45 |
| 1,580,479 | 4/1926 | Frankenfield | 92/45 |
| 1,639,623 | 8/1927 | White | 417/311 |
| 2,889,781 | 6/1959 | Thompson | 417/273 |
| 3,134,508 | 5/1964 | Bayer et al. | 417/383 |
| 3,195,808 | 7/1965 | Holt | 417/273 |
| 3,224,344 | 12/1965 | Baumann et al. | 92/45 |
| 3,394,631 | 7/1968 | Thompson | 92/46 |
| 3,831,499 | 8/1974 | Andrews | 92/45 |
| 3,874,271 | 4/1975 | Eickmann | 91/491 |
| 4,237,775 | 12/1980 | Eisele | 92/45 |

Primary Examiner—Carlton R. Croyle
Assistant Examiner—Paul F. Neils

[57] ABSTRACT

In a fluid pump or motor improvements are provided to the piston shoes therein to permit a higher pressure in the respective device. Other improvements are done to the hydrostatic bearings in radial piston or radial chamber type fluid motors and pumps. A further arrangement is, that plural pistons are applied to permit the use of two different fluids in the respective device. This leads also to the application of disc springs and their modification in a pump or motor to make the pumping of non-viscous fluids like water possible at very high pressure.

5 Claims, 9 Drawing Figures

FLUID PUMPS, FLUID MOTORS AND DEVICES, WHICH INCLUDE A CONED RING

REFERENCE TO RELATED APPLICATIONS

This is a divisional application of application serial number 06-282,990, now U.S. Pat. No. 4,557,347, issued on Dec. 10, 1985, which was filed on 07-14-1981 as a continuation in part application of my older patent application Ser. Nos. 910,809; 911,246 and 223,769; filed on May 30th, 1978; May 31st, 1978 and on Jan. 13th, 1981; respectively, which are now abandoned.

BACKGROUND OF THE INVENTION (a) Field of the Invention

This invention relates to hydrostatic or pneumatic fluid pumps or motors and to devices, like machines and vehicles, wherein the respective pumps or motors are applied. Improvements are made to a piston and piston-shoe assembly to improve the range of pressure in the device economically. Other improvements are made to hydrostatic bearing applications and their communications to spaces under pressure. This is done for hydrostatic bearings on the ends of the rotor(s) as well as to a hydrostatic bearing in the middle between two respective rotors. Consideration is also given to the problem, that some fluids do not have good lubrication properties, like for example, water. Therefore disc-spring modifications have been applied in order to make a pump or motor possible without a closely fitted piston which might weld in a cylinder when operating non-lubricating fluid. Finally improvements have done in the directions and configurations of the ports as well as in the bearings of fluid motors to permit a radial-chamber fluid motor to drive a rotary movement and at the same time to carry a load, whereby several new and useful machines and vehicles are possible by the application of the hollow shaft motor or of the drive and carry motor of the invention.

(b) Description of the Prior Art

The prior art which is partially related to this present patent application is shown for example in my U.S. Pat. Nos. 3,850,201; 3,951,044; 3,874,271; 3,223,046; 4,265,497 or others and also in my elder application Ser. Nos. 910,809; 911,246 and 224,769. The content of applications 910,809 and 911,246 was published in the West German DOS No. 2,921,765 on Feb. 2nd, 1980.

The former art shows piston shoes, which are entering, diving, deep diving piston shoes to obtain long piston strokes or the piston shoes of the former art are outer piston shoes which are assumed to carry a high radial load to permit high pressures in the devices.

The former art also does attempt to provide hydrostatic bearings or support bearings on the rotors of the pump or motors.

The former art also shows control bodies which are responsive to partially eccentric thrust chambers.

While the devices of the described former art act generally satisfactory at certain pressures and rotary revolutions, there are appearing presently limitations, when the devices of the former art are tested in conditions with still higher pressures or revolutions. Problems are also arising, when not very lubricatious fluids are used in the pumps and motors. For example, when water is used instead of oil, the pistons in the respective cylinders tend to wear and stick. The same applies to piston shoes of the former art, when they are applied in water pumps or water operated motors.

The hydrostatic bearings of the former art are heretofore applied to act for certain purposes. In present more general applications however, it appears, that the failure to employ all and the right fluid pressure pockets and communications are limited their use.

And the fluid motors of the former art are commonly unable to permit a hollow shaft with a large enough a diameter to permit the setting of strong machine tool spindles into the respective rotor. The motors of the former art are also failing to permit at the same time the operation of multi-functions, like for example, to drive the rotary movement of an element and to carry the element or a load thereon. They are also failing to be carried by such element and then carry a load themselves.

SUMMARY OF THE INVENTION

The aim of the invention is, to overcome at least partially the limitations of the former art and thereby to improve the devices of the former art as well as to provide novel and useful pumps, motors, machine tools, devices or vehicles, which apply such novel pumps or motors.

It is therefore an object of the invention to provide a piston-piston shoe assembly in a radial piston device, which is able to carry a high radial load and thereby to operate the device with high pressure, while at the same time a portion of the assembly is capable of temporarily entering into the cylinder of the device in order to obtain a relatively long piston stroke.

Another object of the invention is, to prevent the pivoting and sticking of a control body.

A further object of the invention is, to apply a hydrostatic bearing to a housing and a rotor of the device, whereby the bearing builds axially short and carries either a radial load or a radial and an axial load, while it is communicated to a respective space with fluid under pressure.

In a still further object of the invention, the bearing is communicated to a thrust chamber between two seats of a thrust- and control-body.

Still another object of the invention is, to provide to a medial rotor bearing the respective suitable communications, to place the thrust chambers and pistons thereof onto a correct radius "rgc"; to provide correct diameters to the thrust chambers and pistons therein, and also to provide a second axial bearing and communications to a rotor on the other end of the device in order to permit two different pressures in a device with a medial rotor bearing between two rotors and axial thrust provisions in the inner portion of the mdeial rotor bearing.

A still other object of the invention is, to depart the axis of a stroke guide actuator in two different dimensions away from the axes of the rotor and of the control body to increase the smoothness of operation of a pump or motor.

An important object of the invention is also, to provide a pump or motor without pistons which fit closely in cylinders, wherein they are reciprocating, in order to make it possible to use a fluid with little or no capability to lubricate the fitting and moving surfaces, like for example, water.

An object in this connection is also, to use disc-springs to form a pumping or motoring chamber and to compress the chamber by a respective thrust piston.

A still further object of the invention is, to modify the common disc to be able to fulfill the object of using it in or on or to form a pumping or motoring fluid handling chamber.

Still an other object of the invention is, to provide dead space fillers or dead space preventers to disc-spring pumping or motoring chambers.

A further object of the invention is, to provide centering portions or centering bodies to a disc spring assembly.

Another object of the invention is, to provide a simple pump or motor with no fitting pistons or cylinders and to operate the device exclusively by a disc-spring assembly with a piston shoe and a guide face for the piston shoes, whereby the pump becomes very inexpensive and so the motor.

A further object of the invention is, to provide seal means onto a respective tapered disc spring to make a simple application as pumping or motoring chamber possible.

A still other important object of the invention is, to provide a super-critical pressure stage in a pump or motor, wherein the pumping or motor chambers are built by at least one disc spring and the super-critical range permits extremely high pressures by clamping the radial outer end of the respective disc-spring to prevent an opening of a disc-spring pumping or motor chamber under high fluid pressure in the respective chamber.

Due to an object of the invention, related to the last object hereinbefore is, to divide the clamping ring assembly into sections and to provide grooves and into the grooves entering portions on the sections or disc springs in order to prevent escape of the clamping sections from the outer ends of the respective disc spring.

A still other object of the invention is, to provide a taper d disc spring of strong, but glueable material, as for example, carbon fibre and to glue a plurality of disc springs of this type together by respective adhesive material as for example epoxy resin.

According to a further object of the invention, the water pump of disc spring pumping chambers is driven by a hydrostatic motor wih a speed range of rotary velocity, suitable to permit a long life of the disc spring pumping or motoring chamber.

In an other object of the invention, suitable means are provided to drive the disc-spring compression by a respective piston and piston shoe, whereby the faces between the piston and shoe are lubricated by a suitable fluid, for example, by oil, and wherein suitable fluid supply means and communications are provided.

A still further object of the invention deals with arrangements to operate two different fluids.

Therein two different pistons may become connected by suitable arrangement in accordance with a respective object of the invention, to move both pistons in unison.

An object of the invention provides a thrust chamber around the respective ends of the two pistons and different diameters to the pistons, whereby the pressure in fluid in the thrust chamber drives the pistons in a respective outward stroke., while in a still further pbject of the invention, a dirty-fluid collection chamber and dirty-fluid exit passage is provided to prevent a mixing and dirtying of two separated and different fluids in the respective pump or motor.

Another object of the invention is, to set radially distanced from the wall of the cylinder wherein a first piston operates, a ring-groove with a spring therein and to provide a spring bearing and a spring seat on one end of the respective piston to move the respective piston by the expansion force of the spring in an outward stroke.

A further object of the invention is, to provide a housing and strong bearings therein together with a fluid motor of a radial chamber type in order to apply a spindle into the rotor, whereby the spindle is capable of machine tool or respective work, when it is revolved by the mentioned fluid motor.

In a further object of the invention, related thereto, the spindle or shaft is axially moveable in the bearings and in the rotor of the motor and provided with respective seats or holding portions in order to make the application of an axial drive arrangement or thrust and retraction arrangement possible on said shaft to operate the shaft or spindle automatically for rotary movement at work and at the same time to adjust or automatically adjust and stop the axial penetration of the respective spindle.

An other object of the invention provides a hollow shaft motor in order that a shaft or spindle might be inserted into the hollow portion of the motor or in order that the motor may be mounted respectively over a respective shaft or spindle of a device, machine or vehicle.

Still an other object of the invention is, to provide a "drive- and carry-motor" which has strong bearings in order to be able to carry a load in addition to the load in the rotor of the motor and which has ports which are directed in a single dimension with end faces perpendicular to the ports, whereby the motor obtains mounting plane faces whereinto the entrance and/or exit ports are porting in order to obtain an easy assembly of the motor onto a respective load, element, device, machine or vehicle at small space and weight, as well as cost.

Due to a further object of the invention, the drive and carry motor is applied in a truck or car and provided with a pivot arrangement to drive the wheels of the vehicle and to lower and lift the wheels or the body of the vehicle for easy loading of the vehicle and for smooth travel of the vehicle alternatively.

And, a still other object of the invention is, to provide a swing axis assembly with a structure and fluid motors to drive the wheels of the vehicle, wherein the device drives the wheels and at the same time acts as a shock-reducer;

while other objects of the invention are, to apply the drive and carry motor onto respective devices, machines or vehicles.

DESCRIPTION OF THE PREFERRED EMBODIMENTS

In FIGS. 1 to 9 embodiments of disc-spring arrangements are illustrated, which are closely related to and which are continuation-inventions of my earlier patent application Ser. No. 224,769 which was filed on Jan. 13th, 1981, now abandoned.

Figure 2:
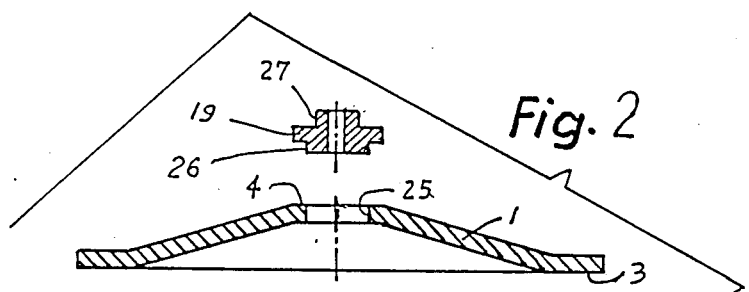
FIG. 2 is a similar longitudinal sectional view through a related embodiment of the invention.

Referring first to the details showing and separated parts showing drawing of FIG. 2; the disc spring of my invention is shown by referential 1. The specifics of my disc spring 1 are, that they are provided with the flat plane end faces 3 and 4 on the bottom outer end and on the top inner end. The spring 1 may also have an inner centering seat 25.

With this spring I can pump a fluid in the range, which I call the sub-critical range of the pump's disc spring 1. This sub-critical range is limited to operation below the sub-critical pressure in fluid. At this sub-critical range the spring 1 is strong enough to resist the axial forces of fluid onto the spring 1 without departing from a seat, whereon the disc spring may lay and seal with flat plane face 3 and/or 4.

The disadvantage of a single disc spring in a pump, compressor or motor is, that the efficiency of the device becomes very low. The fluid acts in axial direction with pressure against the spring, and the spring resists this pressure by the spring capability of the material of the spring, for example, of the spring steel. To pump with a single disc spring, the spring must be stronger, than the entire area of pressure loading supplies fluid pressure. Therefore, the pressure in the fluid will at all times remain in this sub-critical range so low, that only less than half of the axially directed force, which shall move the fluid axially in a pumping stroke, can be used to pump fluid, while at least or slightly more than the other half of the said force is used to compress the spring in the sub-critical range of my invention. Consequentely, the efficiency of the single spring in a pump in the sub-critical range remains at all times below 50 percent total efficiency.

My first means to overcome this problem, is, to set a second spring 1 onto the first spring 1 and mount the second spring diametrically opposed to the first spring 1, whereby a pumping space is formed between the two springs 1 and 2. The axial thrust force required to pump, is now the same, because the compression of the two springs requires only the same force as the compression of the one spring 1 does. But the delivered fluid becomes the double amount.

The length of the way of compression, however, is now doubled compared to the single spring. Consequently, the force has remained equal, but the way of stroke has doubled, so, that in overall, a better efficiency of the compression or thrust arrangement is obtained, but the power amount required in the springs 1 and 2 has not much increased compared to the ratio of the power to the fluid pumping relatively to the one single spring 1.

In the pressure in the fluid increased over the critical pressure between the sub-critical stage and the super-critical stage, the fluid force onto the spring 1 and/or 2 becomes so high, that the spring 1,2 deflects and escapes with its respective end seat face 3 or 4 from its seat in the pump. The pumping chamber below the respective taper of the respective disc spring 1 or 2 then opens and the pumping action is disturbed. The pump experiences a big leakage of fluid and returns to the sub-critical stage.

Figure 1:
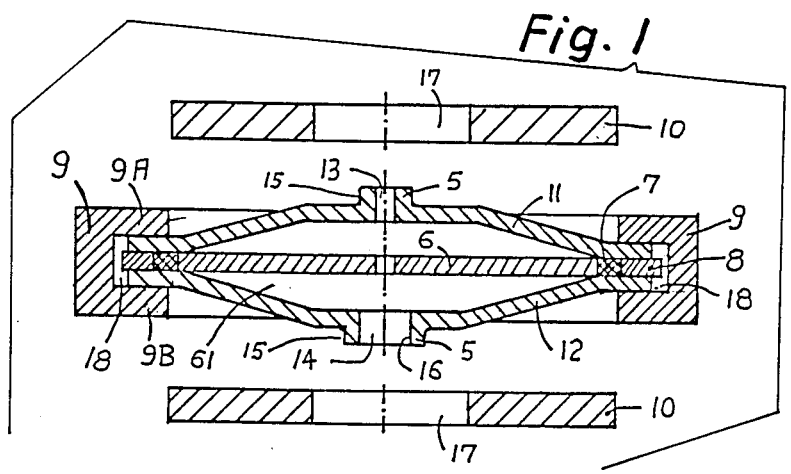
FIG. 1 is a longitudinal sectional view through parts of a disc-spring assembly of an embodiment of the invention.

With this knowledge obtained from the present invention, I now arrange the super-critical stage disc spring arrangement of FIG. 1.

In FIG. 1 disc springs 11 and 12 are laid together similarily with opposite direction as shown by 1 and 2 in FIG. 2. I prefer to lay the outer plane faces 3 onto a plane ring 8. Plane ring 8 is an outer ring. In the interior of the outer ring I prefer to lay a seal, for example, an O-ring 7. Inside of the o-ring 7 I prefer to mount an inner ring plate 6 of equal this thickness as the outer ring 8 has. This inner ring plate 6 acts at the same time as a dead space filler to prevent dead space in the pump chamber 61. For high pressure this dead space filler 6 is important, because when it is not assembled, the fluid would compress in the then hollow space and that would result in a delivery and efficiency loss. Plate 6 becomes a respective passage to pass fluid from the both chamber halves in chamber 61 to the other halves. I prefer to drill a bore of small diameter into the middle of the inner plate 6. If the diameter of this bore is too big, I experience a respective compression loss. But if it is too small, the pump will have respective losses by friction, turbulence and vortices in fluid.

The most important portion of the arrangement of FIG. 1 is the provision of the clamping arrangement 9 of the invention. Clamping arrangement 9 has an inner space 18 which is flanked by inwardly extending ring-arms 9A, 9B, which embrace the outer radial portions of the disc springs 1 and 2. Thereby the springs 1 and 2 or 11 and 12 are clamped together or kept together in axial direction. It is important, that the clamping arrangement 9 is strong enough to resist its own deformation. The higher in the super-critical stage of high pressure the pump shall operate, as stronger must the clamping arrangement 9 be. It must at all times remain so strong, that the springs 11 and 12 can not depart from the outer ring 8 therebetween. Because, if they would depart, the seal 7 would enter the clearance produced by the departure. There the seal would then stick and the pump can not work normal any more.

Also important in a actual design and manufacturing is, that the interior annular ring groove 18 is radially wide enough to provide a space radially outwards of the outer ends of springs 11 and 12. Because by pumping and thereby compressing the springs 11,12 the outer diameter of the springs 1,2,11,12 is slightly increases. Thus, when there is no space radially outward of springs 1,2,11,12, the clamping arranagement 9 would with its medial portion prevent the radial enlargement of the springs 11,12 and thereby it would prevent the compression and the pumping action of the springs 11,12.

The interior space 18 should also be radially wide enough to permit the respective radial expansion of the outer ring 8 in it. Outer ring 8 should be radially wide enough to withstand the pressure from the fluid in the inside in order to prevent breaking of ring 8.

In practice I often add a centering arrangement to the springs 1,2,11,12 of the super-critical range to center multiple disc springs 1,2,11,12 axially behind each other. Because this will bring good increases in efficiency. FIG. 2 shows centering seat 25 whereinto a centering body 19 may be inserted with centering seat 26. Centering body 19 may have a second centering seat 27 on the other axial end thereof. Seat 27 may fit into the third centering seat 29 of a second centering body 20 and the fourth centering seat 28 on the other end of the second centering body 20 may fit into seat 25 of disc spring 1. With the utilization of the centering bodies a number of disc-spring pairs 1,2 can become assembled axially behind each other.

FIG. 1 demonstrates additionally, that the centering bodies can be spared by providing centering portions and seats 5,15,16 on the disc springs 11,12 whereby the disc springs and centering bodies are becoming integral parts. In any case however, the centering bodies 19,20 or the centering portions 5 of the respective disc spring 1,2,11,12 must have a passage 13,14 to permit the flow of fluid into and out of the pumping chamber 61 between the disc springs of the disc spring pair.

To prevent an axial deformation of the respective disc springs 1,2,11,12 by a belly-configuration under very high pressure in the fluid, the ring plates 10 should be laid onto the axial outsides of the respective disc springs 1,2,11,12. The ring plates 10 should have an interior medial bore 17 to contain the respective centering portion or centering body 5,19,20 and, if desired, seal means.

Figure 9:
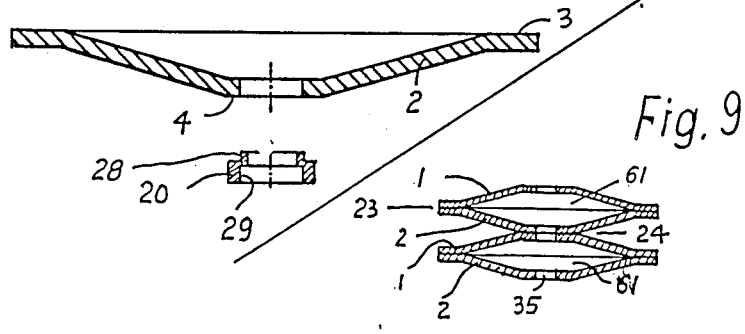
FIG. 9 is a longitudinal sectional view through a still further embodiment of a disc-spring chamber of the invention.

Below FIG. 2 the FIG. 9 is shown. This illustrates a disc spring assembly of the invention for a bright future and massapplication, because it is simple and requires only little space. In this embodiment of the invention, the disc springs 1 and 2 of FIG. 2 are made of a glueable material with spring steel action capability. I prefer to make these springs 1,2 of carbon-fiber material. This material acts in the same way as a metallic disc spring, which would be made of spring steel. But this material has the feature, that it can be glued together by adheasive material; i.e. by epoxy resin. If glued together by faces 3 at location 23 and with faces 4 by location 24, a respective disc spring pair is fastened strongly together and does not require the more expensive clamping arrangement of FIG. 12. By gluing places 24 with faces 4, a multiple disc-spring assembly of multiple or plural disc spring pairs can be made. This is demonstrated in FIG. 9.

Since the clamping of FIG. 1 or the gluing of FIG. 9 now holds the radial outer ends of the disc springs of the respective pair together, these assemblies are now able to operate in the super-critical range. The pressure in the pumping or motoring chamber 61 can now become very high and exceed the sub-critical pressure.

The force required to compress the spring(s) 1,2 can now in the established super-critical range of my invention become smaller than the force to deliver fluid or to consume fluid in a motoring action. The force required to compress the springs may even become negligibly small compared to the force to pump or the force experienced in a motor. The efficiency of the pump or motor can thereby become increased very considerably and can reach higher values than 90 percent overall efficiency. It is seen also here, how important the inner ring 6 is to prevent internal compression in fluid and how important the ring plates 10 are to prevent undesired deformation of the springs 1,2. The assembly of FIG. 9 does however not need the ring plates 10, because in this assembly, the springs 1 and 2 are assisting each other against fatal deformation.

In this regard it is also to be considered, that the disc springs 11 and 12 in FIG. 1 will cause a friction, when the ends thereof move radially—if only slightly—within the clamping arrangement 9. To spare this friction and to obtain a better efficiency I am applying in practice often the arrangement of FIG. 3. The the clamping arrangement 9 is made by three rings 89 to 90, which are clamped together by bolts 92 in threads 33. However, the rings 89 to 91 are separated into ring segments A,B,C etc, as shown in FIG. 4. This separation of the rings 89 to 91 into segments A to X is done to prevent the appearance of friction between the clamping rings 89 and 91 and the outer portions 3 of the disc springs 1,2.

Figure 6:
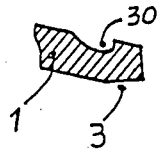
FIG. 6 is a related sectional view longitudinally taken through another embodiment of a disc spring portion of the invention.
Figure 5:
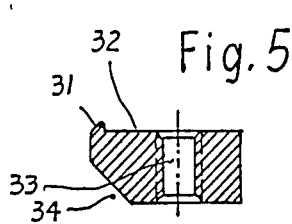
FIG. 5 is a longitudinal sectional view through a disc spring portion of a further embodiment of the invention.

FIGS. 5 and 6 are now showing, that a practical solution should be added to prevent an escape of the segments 89 and 91 A,B,—X from the disc springs 1 and 2. Accordingly, FIG. 6 demonstrates an annular grove 30 in the radial outer portion of disc spring 1 or 2.

FIG. 5 illustrates the application of a finger-like ring segment portion 31 which extends axially away from the plane face 32 to enter into the respective ring groove 30 of the respective disc spring 1 or 2. Such keeper portions 31 are provided on clamping rings 89 and 91.

In practical application I apply this system to disc springs of hardened steel and also harden the ring segments of rings 89 to 91 accordingly. The machining should be made accurately in order that no too deep a ring groove 30 would disturb the strength of the spring 1 or 2. In practical application I am utilizing this embodiment of my invention to pump water in the pumping chambers 61 of FIG. 3 with a pressure of 10.000 to 40.000 psi. At the same time I am keeping the water separate from other fluids in the device of FIG. 3.

In case of application of the arrangement of these Figures, the force required to compress the springs 1,2 is very small compared to the force required to pump the fluid or water with such a high pressure. This arrangement acts at such high pressures in the fluid very deeply in the super-critical stage or range of my invention. Consequently, the very high efficiency of the super-critical range compared to the very low efficiency of the sub-critical range is effectively and reliably obtained by this embodiment of the invention.

Figure 3:
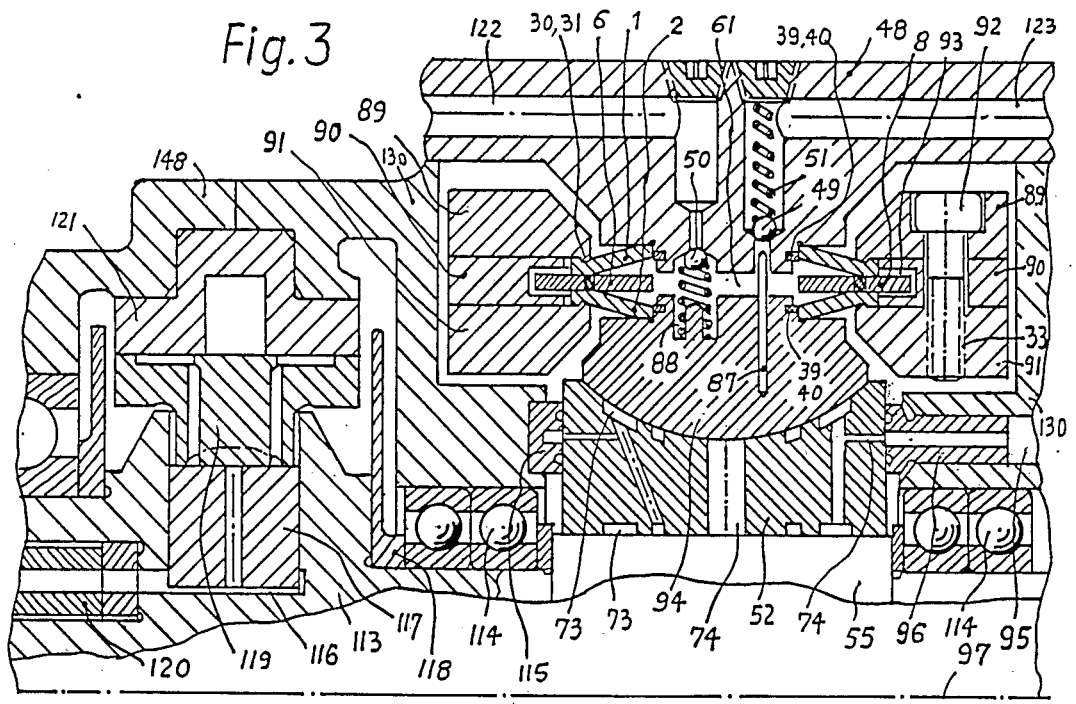
FIG. 3 is a longitudinal sectional view through a portion of a device, which illustrates another embodiment of the invention.
Figure 7:
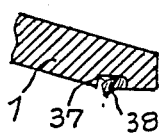
FIG. 7 is a sectional view through a disc spring portion of the invention.
Figure 8:
FIG. 8 is a sectional view through a disc spring portion of the invention.
Figure 4:
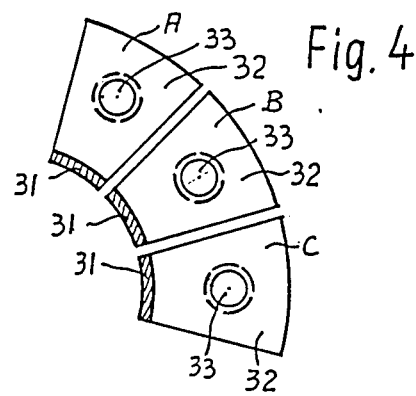
FIG. 4 is a cross-sectional view through a further embodiment of the invention.

In the sample of an embodiment of the invention of FIG. 3, which embodies the capability of operation in the super-critical range of my invention, the pump in the right portion of the Figure is driven by my fluid motor in the left portion of the Figure.

Motor rotor 113 has radial cylinders 116 with pistons 117 reciprocating therein. Piston shoes 119 are interposed between the pistons 117 and the stroke guide arrangement 121. The motor is contained in housing portion 148. The pump is contained in housing portion 130. The driving fluid is supplied into the motor and cylinders 116 through control body 120.

Motor and pump have a common axis 97, but there may be different axes 97, especially when a speed reduction gear is assembled between the motor and the pump. The shaft is revolvingly borne in bearings 114 and provided with the eccentric cam ring portion 55. But 55 may also be a separated cam ring, mounted onto the respective shaft. Housing portion 48 is provided with a head cover 48 which has the inlet and outlet passages 122 and 123 to the inlet valve 50 and the outlet valve 49. Springs 51 may be provided to hold the valves closed at times, when they should not open. Head cover 48 also has the first seat for holding the disc spring 1 with a respective seal seat 39 and seal 40 therein, as shown in an enlargement in FIG. 8 to seat the seat and the disc spring 1. Outer ring plate 6, inner ring plate 6 and the seal 7 therebetween are assembled as in FIG. 1 and the clamping arrangement consisting of the ring segments 89,90, and 91 A to X are assembled, as already discussed. The disc spring 2 is borne with its inner portion on pump-piston 94. Disc spring 1 is provided or attached to the seal 38 for example, in seal seat 37 as shown in an enlargement in FIG. 7. This seal may replace seal ring 7 if so desired. Springs 2 may have the same seal arrangements as springs 1 of FIG. 7 or 8. In any case, the bottom disc spring 2 is sealed against piston 94.

Piston 94 may be provided with a spring containment space 88 for the closing of the inlet valve 50. Piston 94 may also have a seat or bore for a centering pin 87. Centering pin 87 may extend into the exit valve passage and thereby prevent rotation, dislocation or pivoting of the piston 94. Between head cover 48 and piston 94 is the pumping or working chamber 61 provided. It should be understood, that the ends of piston 94 and of head cover 48 should be suitably dimensioned to prevent dead space in chamber 61, when the springs 1,2 are respectively compressed.

In practical application I run the cam ring 55 of the pump with approximately 500 rpm and compress the springs 1 and 2 less than 50 percent of their strokes in order to obtain a long life of the springs. Two million strokes are possible at these rpm and stroke ranges. When the springs 1,2 are compressed at the degree of rate compared to maximum of stroke, the end faces of piston 94 and of head cover 48 should meet or be so close, that dead space in chamber 61 is only a minimum or entirely prevented. At higher rotary speeds and rates of strokes compared to the maximum of stroke of the disc spring, the life time of the device will become drastically reduced. This matter is also one of the reasons, why I am preferring a fluid motor to drive the pump. Because the fluid motor can give the desired rpm, what an electric motor or a combustion engine commonly does not do without the application of a speed reduction gear.

Between eccentric cam 55 and the piston 94 is the piston shoe 52 located. It slides on the outer face of cam 55 and the respective other end face of piston 94 swings or pivotes in the other end face of piston shoe 52. Fluid pressure balancing recesses and sealing lands therearound, forming hydrostatic bearings are applied to both radial ends of the piston shoe 94 in order to make the very high forces of tons of load in the size of the Figure possible at less friction and wear. The lubrication- and balancing-fluid is commonly oil and it is introduced into the respective fluid pressure balancing pockets 73 over respective passages 74 by a fluid flow supply pump over passage 95. Thrust bodies 96 and seal plate portions 115 are sealing the supply of the lubrication- and balancing-pressure fluid, for example oil, into the piston shoe 74.

The thrust bodies 96 are partially located in the bores 95 and are axially movable therein. The high pressure fluid in the bores 95 presses the thrust bodies 96 with their plane head faces against the plane end face of the piston shoe 52 whereby the piston shoe 52 is pressed with its other end face against the plane face of the seal plate portions 115 whereby the mentioned plane faces seal on each other and prevent or reduce leakage along the axial ends of the piston shoe 52.

What is claimed, is:

1. A hydrostatic pump, comprising, in combination, at least one working chamber for the reception and exhaustion of a fluid, inlet means and outlet means communicated to said chamber, at least one pair of coned rings adjacent to said chamber to border said chamber at least partially in two axially opposed directions with said coned rings symmetrically arranged about said chamber, at least one piston movable along its longitudinal axis to at least indirectly bear on one of said coned rings with said piston subjected to a drive means to move said piston along its longitudinal axis in periodic reciprocal movements to periodically increase and decrease the volume of said chamber by periodically expanding and compressing said coned rings and an improvement, wherein said improvement comprises a combination, wherein said combination includes the provision of an outer ring with planar axial end faces and said outer ring provided between the radial outer ends of said coned rings, wherein said outer ring plate provides a distance between said coned rings and a seal ring bed radially inward of said outer ring and between said coned rings, wherein a flexible seal ring is inserted into said seal ring seat, wherein a planar inner ring of a thickness substantially equal to the thickess of said outer ring is inserted radially inward of said seal ring and between said coned rings, and, wherein said outer ring extends radially outwardly beyond the outer diameters of said coned rings, 2. The pump of claim 1, wherein a surrounding ring is laid radially outwards of said outer ring to, surround said outer ring, while said surrounding ring extends axially in both directions from said outer ring, wherein an annular groove extends from the inner diameter of said surrounding ring radially outwardly directed into said surrounding ring, and, wherein said outer ring extends partially into said annular groove of said surrounding ring.

3. A hydrostatic pump, comprising, in combination, at least one working chamber for the reception and exhaustion of a fluid, inlet means and outlet means communicated to said chamber, at least one pair of coned rings adjacent to said chamber to border said chamber at least partially in two axially opposed directions with said coned rings symmetrically arranged about said chamber, at least one piston movable along its longitudinal axis to at least indirectly bear on one of said coned rings with said piston subjected to a drive means to move said piston along its longitudinal axis in periodic reciprocal movements to periodically increase and decrease the volume of sid chamber by periodically expanding and compressing said coned rings and an improvement, wherein said improvement comprises a combination, wherein said combination includes the provision of an outer ring with planar axial end faces and said outer ring provided between the radial outer ends of said coned rings, wherein said outer ring provides a distance between said coned rings and a seal ring bed radially inward of said outer ring and between said coned rings, wherein a flexible seal ring is inserted into said seal ring seat;

wherein said outer ring extends radially outwardly beyond the outer diameters of said coned rings, wherein said pair of coned rings with said outer ring between them are clamped together by a clamping means, and, wherein said clamping means is provided by ring means which include clamping portions which embrace the radial outer ends of said coned rings axially and which are radially divided into ring sections with at least one bolt provided to hold the ring portions of the respective section of said rings together.

4. A hydrostatic pump, comprising, in combination, at least one working chamber for the reception and exhaustion of a fluid, inlet means and outlet means communicated to said chamber, at least one pair of coned rings adjacent to said chamber to border said chamber at least partially in two axially opposed directions with said coned rings symmetrically arranged about said chamber, at least one piston movable along its longitudinal axis to at least indirectly bear on one of said coned rings with said piston subjected to a drive means to move said piston along its longitudinal axis in periodic reciprocal movements to periodically increase and decrease the volume of said chamber by periodically expanding and compressing said coned rings and an improvement wherein said improvement comprises a combination wherein said combination includes the provision of an outer ring with radially plane axial end faces and said outer ring provided between the radial outer ends of said coned rings, wherein said outer ring provides a distance between said coned rings and a seal ring bed radially inward of said outer ring and between said coned rings, and, wherein a flexible seal ring is inserted into said seal ring seat, wherein a piston shoe is interposed between said one of said coned rings and said piston, wherein said piston is provided with a slide face which is laid upon a stroke guide face of an eccentric cam of said drive means, wherein fluid pressure balancing pockets are provided in said piston, wherein said piston includes lateral radially plane face portions and passages which extend from said pockets into passage ports which port into said plane face portions, and, wherein said piston is provided in a cylinder which is provided in a portion of a housing while at least one thrust chamber is provided in said housing in the neighborhood of said piston and a thrust body provided in said thrust chamber with a thrust head with a radially plane head face and a passage longitudinally through said thrust body to meet at least one of said passage ports while fluid under pressure in said thrust chamber presses said head face against a respective face portion of said face portions and thereby to seal the flow of pressure fluid from said thrust chamber into said passages and into said fluid pressure pockets in said piston.

5. A hydrostatic pump, comprising, in combination, at least one working chamber for the reception and exhaustion of a fluid, inlet means and outlet means communicated to said chamber, at least one pair of coned rings adjacent to said chamber to border said chamber at least partially in two axially opposed directions with said coned rings symmetrically arranged about said chamber, at least one piston movable along its longitudinal axis to at least indirectly bear on one of said coned rings with said piston subjected to a drive means to move said piston along its longitudinal axis in periodic reciprocal movements to periodically increase and decrease the volume of said chamber by periodically expanding and compressing said coned rings and an improvement, wherein said improvement comprises a combination wherein said combination includes the provision of an outer ring with radially plane axial end faces and said outer ring provided between the radial outer ends of said coned rings, wherein said outer ring provides a distance between said coned rings and a seal ring bed radially inward of said outer ring and between said coned rings, and wherein a flexible seal ring is inserted into said seal ring seat, wherein a piston shoe is interposed between said one of said coned rings and said piston, wherein said piston is provided with a slide face which is laid upon a stroke guide face of an eccentric cam of said drive means, wherein fluid pressure balancing pockets are provided in said piston, wherein said piston includes lateral radially plane face portions and passages which extend from said pockets into passage ports which port into said plane face portions, wherein said piston is provided in a cylinder which is provided in a portion of a housing while at least one thrust chamber is provided in said housing in the neighborhood of said piston and a thrust body provided in said thrust chamber with a thrust head with a radially plane head face and a passage longitudinally through said thrust body to meet at least one of said passage ports while fluid under pressure in said thrust chamber presses said head face against a respective face portion of said face portions and thereby to seal the flow of pressure fluid from said thrust chamber into said passages and into said fluid pressure pockets in said piston, and;

wherein a fluid motor is provided in said housing, wherein said fluid motor is provided with a shaft, and, wherein said shaft of said fluid motor carries said cam.

* * * * *